Figure 1:
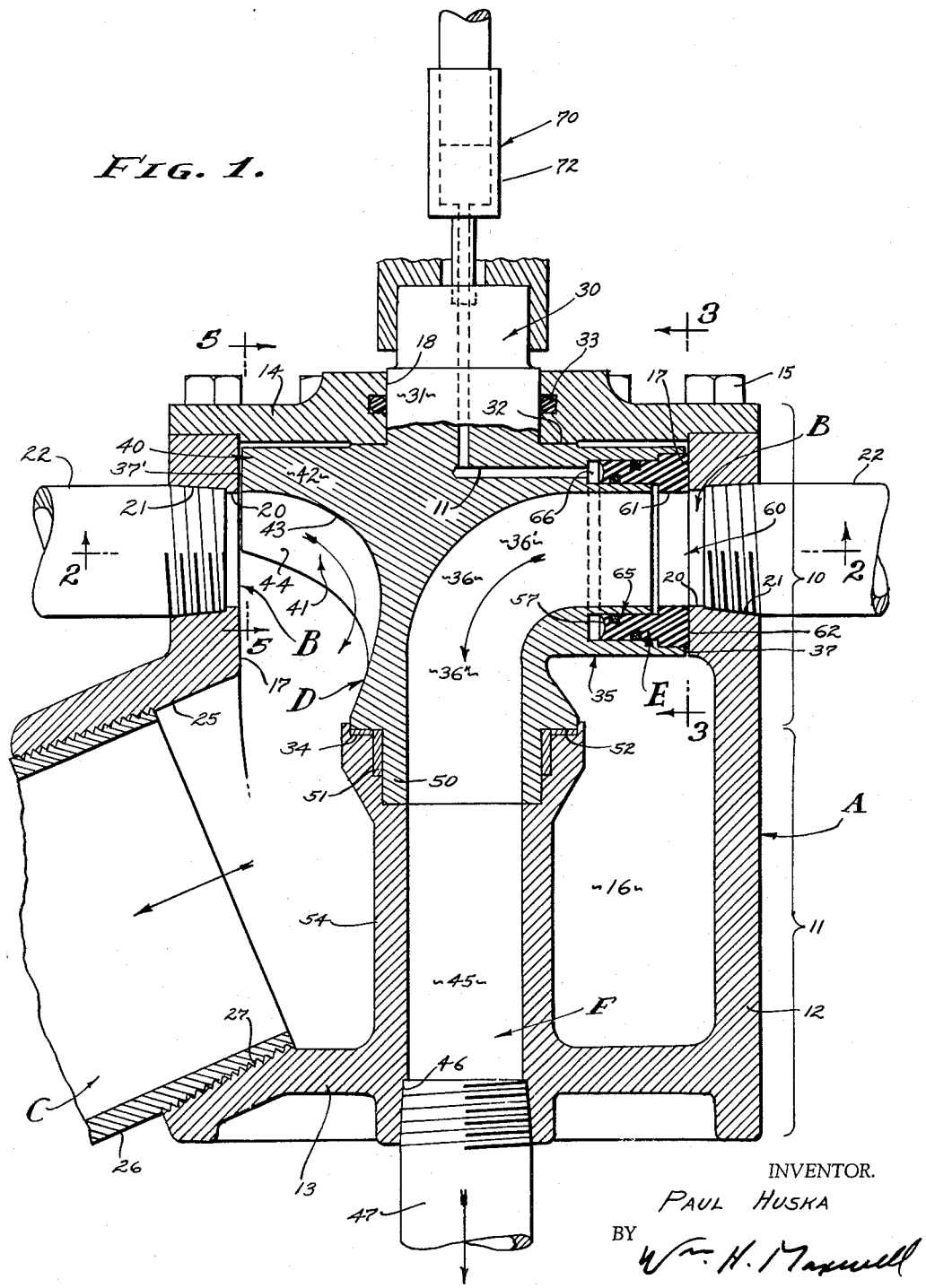

Aug. 15, 1961 P. HUSKA 2,996,083
CONTINUOUS FLOW ROTARY SELECTOR VALVE
Filed July 10, 1958 2 Sheets-Sheet 1

INVENTOR.
PAUL HUSKA
BY Wm. H. Maxwell
AGENT

Aug. 15, 1961 P. HUSKA 2,996,083
CONTINUOUS FLOW ROTARY SELECTOR VALVE
Filed July 10, 1958 2 Sheets-Sheet 2

INVENTOR.
PAUL HUSKA
BY
AGENT

United States Patent Office 2,996,083
Patented Aug. 15, 1961

2,996,083
CONTINUOUS FLOW ROTARY SELECTOR VALVE
Paul Huska, 739 Moreno Ave., Los Angeles, Calif.
Filed July 10, 1958, Ser. No. 747,723
3 Claims. (Cl. 137—625.11)

This invention has to do with a rotary valve that is adapted to accommodate a plurality of fluid handling lines, and it is particularly concerned with a rotary valve handling flow of fluid through a plurality of lines and in communication with a main flow line that continuously handles the flow of the first mentioned lines, and a valve that is adapted to selectively communicate with any one of the first mentioned lines to connect said one line with a secondary flow line.

Valves of the type under consideration have been built, and, generally, they operate for the purpose intended. However, they are limited in several respects, namely, in the rotatability and number of flow lines handled thereby, and in adequacy of means for directing fluid without impedance and turbulence. For example, a usual valve has a body with a single chamber, and the peripheral wall has a circumferentially spaced series of ports, a plurality of said ports being connected to the flow lines and a single enlarged port connected to a main flow line. Such a valve has a rotor and this rotor is selectively movable into alignment with any one of the ports except for the main port which is too large for cooperation with the rotor. Therefore, the portion of the periphery occupied by the main port cannot be used by the rotor and this decreases the selectivity by at least one position. For example, a usual valve large enough to have nine ports can usefully employ only seven or eight ports since the main port is large and occupies the space of at least one if not two of the smaller ports. Further, in a valve that has the main port at the same level as the other ports, or in the same body part and opening into the same chamber, the rotor obstructs the free flow of fluid resulting in turbulence and the action thereof is not altogether uniform or predictable. For instance, oil and water will emulsify when subjected to excessive turbulence, which is detrimental.

An object of this invention is to provide a rotary valve of the type under consideration that is rotatable throughout 360°. The valve that I provide has a sectional body with a portion thereof devoted entirely to ports and fluid handling lines spaced in a continuous circumferential series.

Another object of this invention is to provide a rotary valve of the type under consideration that has unobstructed flow and wherein the operation of a selecting rotor throughout 360° does not interfere with handling of or impede flow through a main fluid handling line. The valve that I provide has a sectional body with a portion thereof devoted to a plurality of ports and fluid handling lines and also with a portion thereof devoted to a main port and flow line of large size and full capacity. The rotor of the valve operates within the body sections to be in communication with any one of the plurality of ports without interfering with or obstructing flow to or from the main port and flow line.

It is an object of this invention to provide a rotary valve of the type under consideration that directs and turns the flow of fluid in a predetermined manner so that there is a minimum pressure drop and so that the flow thereof is smooth and uniform and does not wear excessively upon the valve parts. In the structure that I provide there is fluid turning means incorporated in the rotor and adapted to direct fluid from radial flow to axial flow, or vice versa, as the case may be.

It is another object of this invention to provide a relatively simple and inexpensive rotary valve having the features thus far referred to and which is practical and reliable under operating conditions. The valve, as later described, not only involves few simply and easily formed parts, but has maximum selectivity and it operates to smoothly comingle or blend, or separate, fluids with efficiency, without impeding the flow thereof, and with a minimum of wear on the valve parts.

It is still another object of this invention to provide a rotor and a seal therefor in a valve of the type under consideration that is operable to be engaged and released for fluid tight operation with any one of the fluid handling ports involved. The seal that I provide is carried by the valve rotor and is fluid operated to cooperate with the valve body surrounding the port that is selected to communicate with the rotor.

Figure 2:
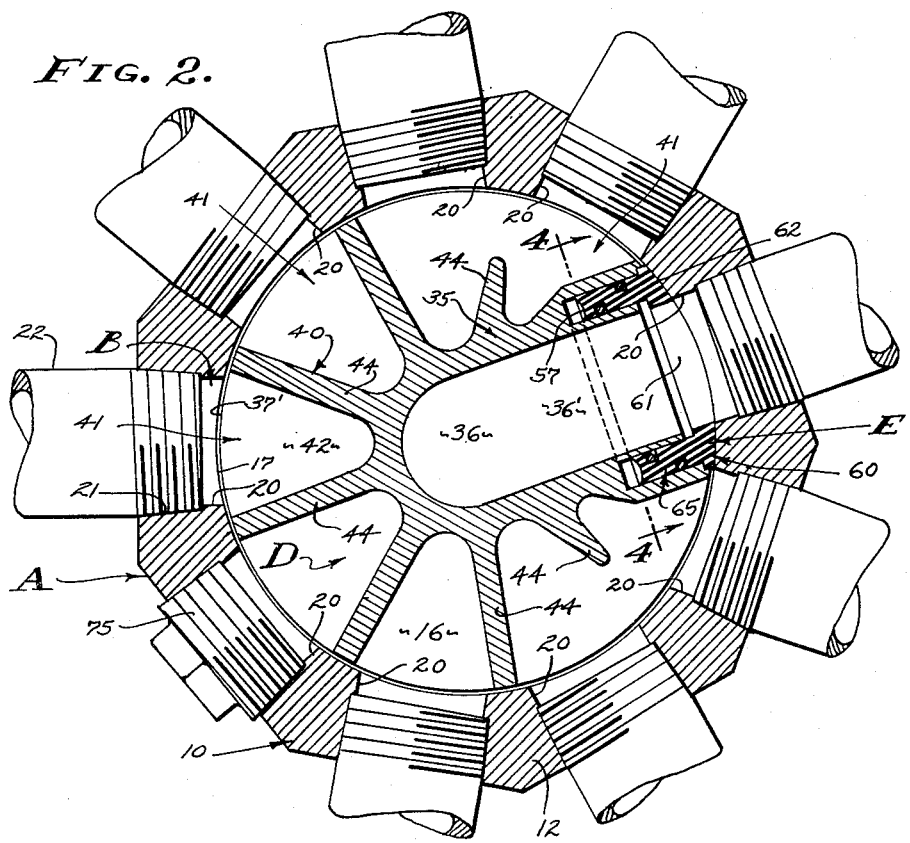
Figure 3:
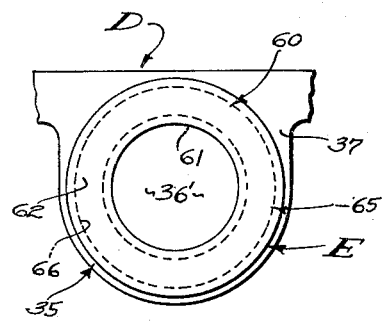
Figure 4:
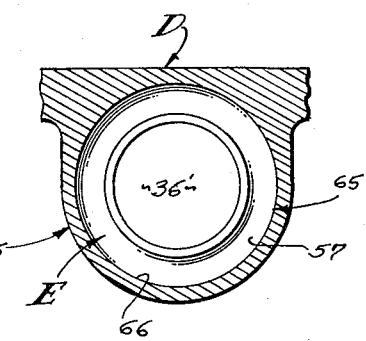
Figure 5:
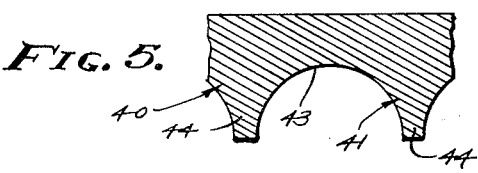

The various objects and features of the present invention will be fully understood from the following detailed description of a typical preferred form and application of my invention, throughout which description reference is made to the accompanying drawings, in which:

FIG. 1 is an elevational sectional view taken vertically through a valve embodying the features of the present invention. FIG. 2 is a transverse sectional view taken substantially as indicated by line 2—2 on FIG. 1. FIG. 3 is a view of the rotor that I provide and shows a portion of the structure as indicated by line 3—3 on FIG. 1. FIG. 4 is a sectional view similar to FIG. 3 and shows a portion of the rotor as indicated by line 4—4 on FIG. 2, and FIG. 5 is a view of the rotor and shows a portion thereof as indicated by line 5—5 on FIG. 1.

The valve of the present invention is a rotary selector valve and is particularly useful for the purpose of comingling a plurality of streams of fluid so that they normally flow through a main line and wherein any one of said streams can be selectively by-passed through a secondary line. This selective by-passing feature is employed in order to sample flow from any one of the streams without interfering with flow from the remaining streams in communication with the main flow line. The present invention provides an improved valve of the type thus far referred to and involves, generally, a sectional body A, a circumferential series of fluid handling ports B entering into one section of the body, one or more fluid handling ports C entering into another section of the body, a rotor D selectively operable within the body to align with and conduct fluid from any one of the ports B, sealing means E in connection with the rotor D to seal at each selected port B, and a fluid passage F in communication with the rotor D to handle fluid from the selected port B.

The sectional body A is a chambered element wherein the plurality of streams of fluid comingle when they enter the body through the ports B. As shown, the body A is circular in plan configuration and has upper and lower sections 10 and 11, the upper section 10 being devoted entirely to the accommodation of the ports B and the lower section 11 to the port or ports C. The body A has an outer wall 12, cylindrical at the upper section 10 thereof, and it is closed by a bottom 13 and by a top 14. In the particular case illustrated the bottom 13 is formed integrally with the wall 12 and the top 14 is a removable part secured in working position as by screw fasteners 15, or the like. Thus, a single closed chamber 16 is established within the body A, said chamber having upper and lower portions corresponding to the upper and lower sections 10 and 11 of the body. In accordance with the invention, the upper section 10 of the valve body A is concentrically bored to have a smooth inner wall 17 for cooperation with the rotor D, as later described, and the top 14 has a central opening 18 adapted to rotatably pass a part of the rotor D for operation thereof. The wall 17 and opening 18 are concentric with the vertical axis of the valve.

The ports B that enter into the valve body A enter into the upper section 10 thereof and open into the chamber 16 at the wall 17. In the case illustrated there are nine equally spaced ports B each port being formed by an opening 20 that extends radially of the valve body to open into the chamber 16 and to communicate with a fluid line 22 at the exterior of the valve. The ports B are proportioned and spaced so that a substantial margin of the wall 17 surrounds and encircles each port. As shown, the valve body A is threaded at the outer end portion 21 of each opening 20 for reception of a threaded pipe line 22. There is a plurality of pipe lines 22, one joined to each port B, as by said threaded connection, it being understood that any one of the ports B can be closed by a plug 75, if so desired.

The ports C, preferably a single port C that enters the valve body A, enter into the lower section 11 thereof and open into the chamber 16 through the side wall 12 or bottom 13, or both. In the case illustrated there is a single main port C proportioned to handle the combined flow of all the ports B and that is formed by an opening 25 that extends radially of the body to open into the chamber 11 and to communicate with a main fluid line 26 at the exterior of the valve. As shown, the valve body A is threaded at the outer end portion 27 of the opening 25 for the reception of a threaded pipe line 26. In carrying out the invention, the axis of the line 26 is downwardly and outwardly disposed in order to gain added clearance surrounding one of the ports B overlying the pipe 26 (see FIG. 1).

From the foregoing, it will be apparent that I have provided a valve body A that has upper and lower sections 10 and 11 establishing a single chamber 16, and wherein the plurality of ports B are confined to the upper section 10 and wherein the port C is confined to the lower section 11.

The rotor D that selectively operates within the body A to align with the ports B and to conduct fluid to a secondary fluid passage F, later described, is a manually operable, or otherwise operable, element adapted to be positioned as desired. In accordance with the invention, the rotor D is rotatable continuously through 360° and can be aligned with any one of the nine ports B (as shown), as circumstances require. The rotor D is journaled in the body A to be accommodated within the chamber 16 to occupy a substantially small part of the upper portion thereof, and involves, generally, an operating stem 30, a radially disposed fluid conducting arm 35, and fluid directing means 40. The operating stem 30 is rotatably supported by the body A, the fluid conducting arm 35 is adapted to align with any one of the ports B, and the fluid directing means 40 governs the flow of fluid from the ports B not selectively aligned with the arm 35 of the rotor D.

The operating stem 30 of the rotor D is rotatably carried within the chamber 16 on the central axis of the valve and involves a shaft 31 that extends through the opening 18 to be accessible at the exterior of the valve. The shaft 31 is rotatable in the opening 18 and the stem is restrained from upward movement by means of a shoulder 32 that has axial thrust engagement with a face at the lower side of the top 14. A seal 33 is provided to pack-off the stem 30 at the opening 18.

In the form of the invention illustrated, the rotor D is also journaled on a trunnion 50 that projects downwardly from the rotor to be rotatably carried in a bearing 51 within the chamber 16. In practice the bearing 51 is positioned within the chamber 16. In practice the bearing 51 is positioned within the chamber 16 at a point intermediate the upper and lower section of the body A and there is a downwardly facing shoulder 34 that has axial thrust engagement with an upwardly thrust washer 52 facing at the upper end of the bearing 51. Thus, the rotor stem 30 is restrained from axial movement in either direction, and is free to turn without stoppage, in either direction. In carrying out the invention, the stem 30 is a shaft-like part with the lower portion thereof tubular in cross section for purposes later described.

The radially disposed fluid conducting arm 35 is provided to align with any one of the ports B and is a laterally disposed tubular part that projects from the stem 30 to be carried thereby into alignment with a selected port B. The arm 25 is formed integrally with the stem 30 and has a passage 36 that extends laterally and also inwardly and downwardly to communicate with the lower tubular portion of the stem. That is, the passage 36 has a radially extending lateral portion 36' and a longitudinally extending axial portion 36", said two portions being joined by an intermediate arcuate portion. In accordance with the invention, the outer terminal end 37 of the arm 35 is arcuately turned so as to closely approach the cylindrical inner wall 17 of the upper section 10 of the body A. The passage 36 is the same cross sectional configuration as the ports B and, therefore, the stem 30 carrying the arm 35 can be revolved, as desired, to selectively align the said passage 36 with any one of the ports B for free flow of fluid through the tubular portion of the stem 30.

The fluid directing means 40 of the rotor D is formed integrally with the rotor and is provided to govern the flow of fluid from the ports B, excepting the one port B aligned with the arm 35. When the valve is used as a comingling valve the streams of fluid flow radially inward to mix with in the chamber 16 and the means D is adapted to effect said flow so that each individual stream is turned downwardly to flow axially of the valve from the section 10 to the section 11 thereof. Therefore, deflectors 41 are provided, said deflectors 41 acting to turn each stream with a minimum of obstruction to flow and with a minimum of turbulence. As shown, there is a deflector 41 for each of the eight remaining ports B not aligned with the arm 35 and each deflector is aligned with a port.

The deflectors 41 of the fluid directing means 40 are alike and involve, generally, a plate 42 projecting radially of the stem 35 and with an outer terminal end 37' arcuately turned so as to closely approach the cylindrical inner wall 17 of the upper section 10 of the body A. In practice, the ends 37 and 37' are continuations of each other to the end that the rotor D has an outer periphery that closely approaches the wall 17, and so that the plates 42 form a radial flange. Said flange formed by the plates 42 is disc-shaped and lies adjacent the underside of the top 14 and so that the ports B discharge into the chamber 16 immediately adjacent and below the plates.

In order to turn the streams of fluid entering the chamber, the plates 4 are shaped to have an inwardly and downwardly curved deflecting face 43 that extends radially inward from the periphery of the rotor and then extends axially downward to merge with the diameter of the stem 30. It is preferred that the deflector 41 be shaped to receive a stream of fluid with a minimum of disturbance thereof, and therefore, each deflector 41 is arcuate in cross section (see FIG. 5) forming a continuation of the upper portion of each port B. In practice, the face 43 depends at both sides of the port B aligned therewith so that somewhat less than one half of the port B is covered by the deflector, and with the result that there is a partition 44 that separates the streams flowing from adjacent ports. The partitions 44 are faced inwardly and downwardly to merge with the stem, as shown, and in the case of the deflectors adjacent the arm 35 the partitions are minimized, in radial extent, so as not to interfere with the free flow of fluid from the related ports B (see FIG. 2).

The fluid passage F that communicates with the rotor

D to handle fluid from the selected port B is provided to connect with the passage 36 and in the case under consideration where the passage 36 is turned downwardly the fluid passage F communicates with the lower axially extending portion 36" of the said passage 36. As shown, the bearing 51 involves a tubular supporting element 54 that projects upwardly and extends into the chamber 16 and which has a bore 45 extending centrally and axially therethrough. The bore 45 is proportioned to form an unobstructed continuation of the passage 36 and is in open communication with the portion 36" through the lower end thereof, the bore 45 being threaded as at 46 for reception of a threaded pipe line 47. It will be apparent how the bearing 51 can be constructed to surround the bore 45 allowing the rotor D to turn with the passage 36 and bore 45 connected, and if desired a suitable fluid seal can be installed at said joint between the rotor D and bearing 51.

The sealing means E is provided to establish a fluid tight joinder between the terminal end 37 of the arm 35 and the wall 17 surrounding the port B aligned therewith. The means E is a fluid pressure operated means and involves a shoe or facer 60, a piston 65 and fluid pressure generating means 70. The facer 60, piston 65 and means 70 are preferably carried by the rotor D there being one facer 60 for engagement with any one of the ports B. However, it is to be understood that a facer can be carried by the valve body at each port B and operated by individual pistons, etc. As shown, the facer 60 is shiftably carried at the terminal end of the arm 35 and is adapted to have pressured engagement with the wall 17. A radially disposed cylindrical guideway opens at the end 37 to slidably receive the facer 60 and the facer 60 has a central opening 61 corresponding in cross section to the port B and passage 36.

The facer 60 is characterized by an arcuate radially disposed face 62 for flat engagement with the wall 17 surrounding the port B, and in accordance with the invention the facer is formed of a body of resilient material adapted to conform with the exact contour and any irregularities of the wall 17. In practice, I form the facer 60 of "Teflon," as manufactured by Du Pont, a tetrafluoroethylene resin product that has the desired physical properties desired, to resist abrasion, chemical action and which is dimensionally stable.

The piston 65 is provided to shift the facer 60 outwardly into pressured engagement with the wall 17, and, as shown, involves an annular part that operates in an annulus 66 surrounding the passage 36. The piston 65 is formed integrally with the facer 60 for convenience of manufacture and carries inner and outer peripheral seals to engage with the inner and outer walls of the annulus 66. The annulus 66 opens outwardly into the guideway above referred to and is turned concentrically with said guideway. Since the piston 65 is formed of a resilient material, the inner end 57 thereof is concaved to have inner and outer sealing lips engageable with the inner and outer walls of the annulus 66, and so that operating fluid under pressure does not by-pass the piston.

The fluid pressure generating means 70 is provided to operate the piston 65 to force the facer 60 into pressured engagement with the wall 17, and involves a fluid passage 71 in communication with the inner end of the annulus 66 and a source 72 of fluid under pressure. The fluid passage 71 is characterized by opening from the stem 30 along the central axis thereof and at the top of the stem 30 to be accessible at the exterior of the shaft 31. The fluid source 72 is connected to the passage 71 and may be any suitable means to supply fluid under pressure and that can be applied when desired. As shown, a simple cylinder and piston mechanism 72 is coupled to the stem 30 so that when force is applied to the piston thereof, fluid under pressure is communicated to the annulus 66 to yieldingly urge the facer 60 into pressured engagement with the wall 17 sealing around the port B that has been selected.

The selector valve hereinabove described is particularly useful in the comingling of a plurality of streams of fluid, such as liquid petroleum as produced by wells and supplied to the valve through separate pipe lines 22. The valve normally handles said plurality of streams so that they are directed to a main pipe line 26, and the valve is characterized by a rotor D that can be selectively positioned to by-pass any one of said streams into a secondary pipe line 47. The particular valve illustrated has nine ports B, one of which may be blanked or closed as by a plug 75, and when it is desired to sample, or to draw fluid from any one of the plurality of streams, the appropriate port B is selected whereupon pressure is exerted upon the facer 60 so that the sealing means E establishes a fluid tight connection between the valve body A and the rotor D.

With the arm 35 of the rotor D aligned with a port B the deflectors 41 are each aligned with a port B and with the result that fluid is conducted radially inward and then downward and axially to flow from the upper body section 10 to the lower body section 11. It will be apparent that the rotor is movable through 360° in either direction, or continuously in one direction, and that the entire periphery of the body A is devoted to the accommodation of inlet ports B. Further, the inward and downward flow is without obstruction and is smooth and without impedance of any kind. Also, with the rotor sealed by operation of the means E there is no contamination of the one stream being sampled, and in addition the flow through the valve, whether through the chamber 16 or through the passage 36, is without excess turbulence and to the end that emulsifying of the fluid, such as oil and water, is reduced to a minimum.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A valve for communicating a plurality of lines with a main line and for selectively by-passing flow through any one of said plurality of lines to a secondary line, and including, a substantially elongate body having upper and lower sections and with a peripheral wall to define a chamber therein, a plurality of flow lines opening into ports in the wall of the body and to be in communication with the chamber at the upper section of the body, a main line opening into a port at the lower section of the body and to be in communication with the chamber, a secondary line comprising a tubular support projecting into the lower section of the body, and a disc-shaped rotor rotatably carried by the body to occupy the upper section thereof and having downwardly curved fluid deflectors operable in said upper section to align with the first mentioned ports in the wall of the body and said rotor having a passage therein selectively communicating any selected one of said first mentioned ports in the wall of the body with the secondary line of the said tubular support, said deflectors turning the fluid flow from the upper section of the body to flow axially of the valve chamber and into the lower section of the body.

2. A valve for communicating a plurality of lines with a main line and for selectively by-passing flow through any one of said plurality of lines to a secondary line, and including, a substantially elongate body having upper and lower sections and with a peripheral wall to define a chamber therein, a plurality of flow lines opening into ports in the wall of the body and to be in communication with the chamber at the upper section of the body, a main line opening into a port at the lower section of the body and to be in communication with the chamber, a secondary line comprising a tubular support projecting into the lower section of the body, and a disc-shaped rotor rotatably carried by the body to occupy the upper section thereof and having downwardly curved fluid deflecting faces adjacent to the first mentioned ports and extending radially inward and then downward from the periphery of the chamber and selectively operable in said upper section to align with the first mentioned ports in the wall of the body and said rotor having a passage therein selectively communicating any selected one of said first mentioned ports in the wall of the body with the secondary line of the said tubular support, said deflectors turning the fluid flow from the upper section of the body to flow axially of the valve chamber and into the lower section of the body.

3. A valve of the character described and having a chamber defined by a cylindrical wall and having a series of circumferentially spaced ports in the wall and entering into the chamber, and including, a rotor selectively operable in the chamber and having an arm with a passage therethrough to align with any one of the said ports, said arm closely approaching the wall of the valve, there being a cylindrical guideway at the outer terminal end of the arm and an annulus with inner and outer diameter walls entering radially inward thereby forming the guideway, and an annular seal shiftably carried in the guideway in engagement with said inner and outer diameter walls and so as to project from the outer terminal end of the arm and to move radially into engagement with the wall of the valve, and means adapted to apply fluid pressure to the annulus radially inward of the seal to urge it outwardly into pressure engagement with the said valve wall.

References Cited in the file of this patent

UNITED STATES PATENTS

| | | |
|---|---|---|
| 825,370 | Zurbuch | July 10, 1906 |
| 1,791,923 | Eule | Feb. 10, 1931 |
| 1,872,417 | Dalldorf et al. | Aug. 16, 1932 |
| 2,746,712 | Wickman | May 22, 1956 |
| 2,774,554 | Ashwood et al. | Dec. 18, 1956 |
| 2,821,998 | Mayhew | Feb. 4, 1958 |
| 2,835,273 | McDonald | May 20, 1958 |
| 2,840,109 | Wadleigh | June 24, 1958 |

FOREIGN PATENTS

| | | |
|---|---|---|
| 377,140 | Italy | Dec. 12, 1939 |